Figure 4:
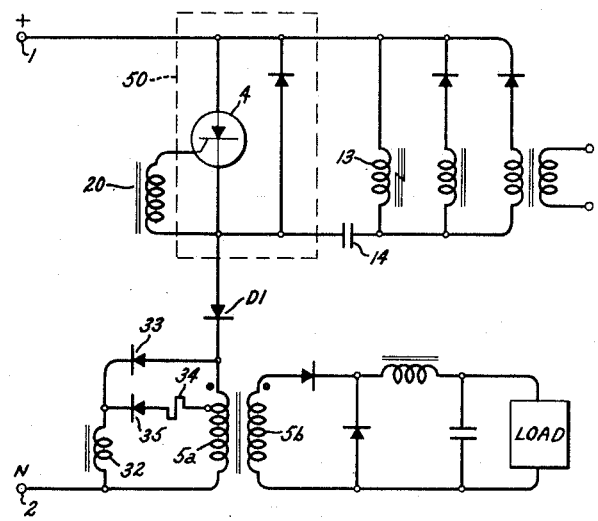

Jan. 5, 1965
R. E. MORGAN
3,164,767
SYNCHRONIZATION AND LOCKOUT CONTROL
SYSTEM FOR CONTROLLED RECTIFIERS
Filed April 10, 1961
2 Sheets-Sheet 1
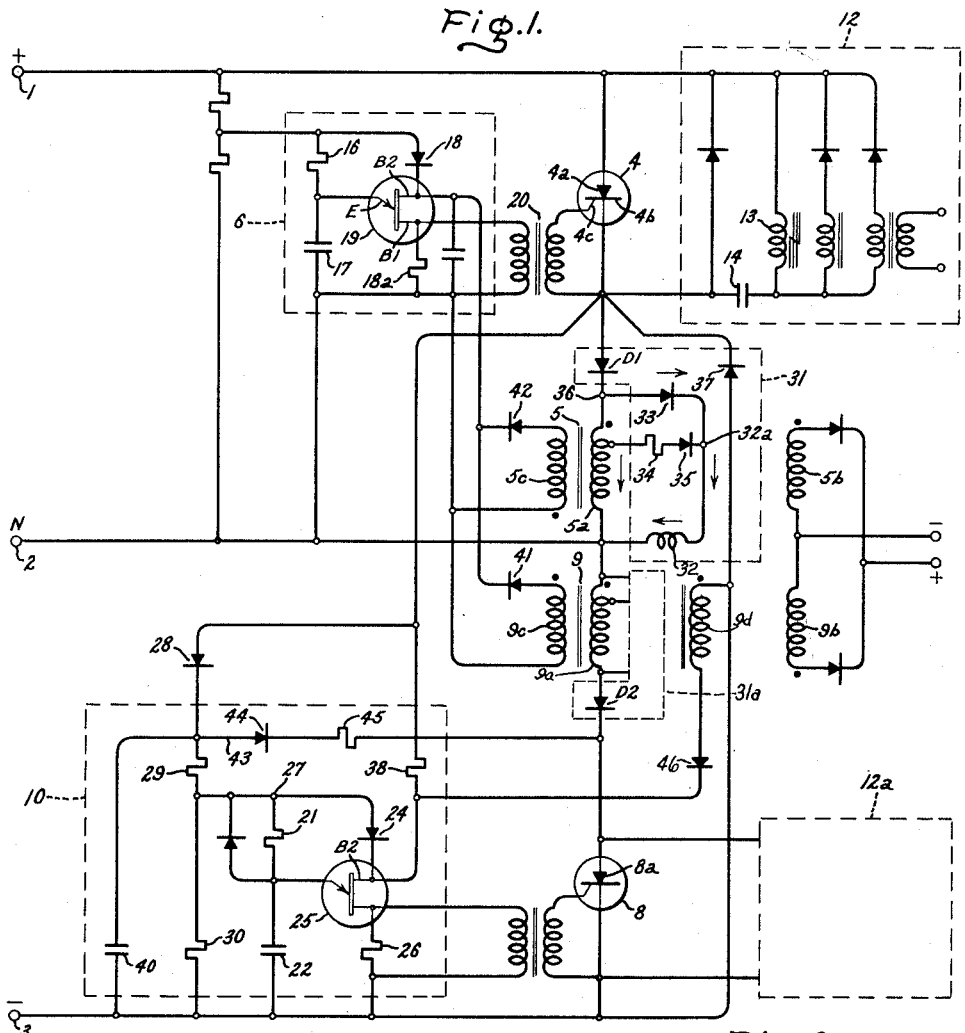
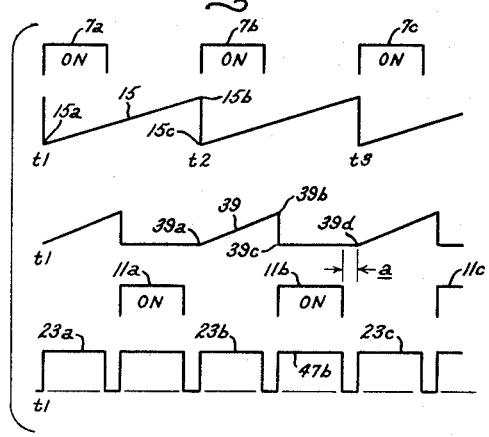
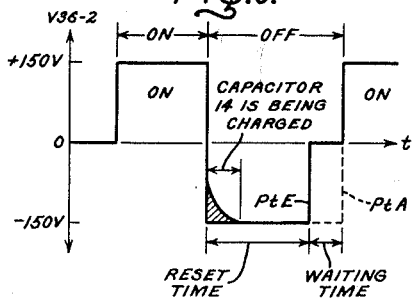
Inventor:
Raymond E. Morgan,
by *Irving H. Marshman.*
Attorney.

Inventor:
Raymond E. Morgan,
by Irving H. Marshman
Attorney.

United States Patent Office 3,164,767
Patented Jan. 5, 1965

3,164,767
SYNCHRONIZATION AND LOCKOUT CONTROL SYSTEM FOR CONTROLLED RECTIFIERS
Raymond E. Morgan, Schenectady, N.Y., assignor to General Electric Company, a corporation of New York
Filed Apr. 10, 1961, Ser. No. 101,858
5 Claims. (Cl. 321—35)

This invention relates to control systems, more particularly to control systems in which a plurality of solid state controlled rectifiers are employed, and an object of the invention is the provision of means for interlocking the operations of two or more such rectifiers in a manner to minimize dangerous or other unwanted operating conditions.

A related object of the invention is the provision of means for synchronizing the operations of a plurality of solid state controlled rectifiers.

Another aspect of the invention relates to control systems which utilize combinations of solid state controlled rectifiers and saturable core devices, such for example as transformers and reactors, and accordingly, another object of this invention is the provision of means for resetting the flux in the core of the saturable device at the end of the saturating period together with means for locking out an associated solid state controlled rectifier during the resetting operation. Solid state controlled rectifiers are frequently employed in D.-C. circuits in combination with saturable core devices. A further object of this invention is the provision for turning off a controlled rectifier employed in such combination by means of energy stored in a quenching network and the provision of means for resetting the flux in the saturable core coordinated with the quenching means to store energy therein during reset.

By way of a summary account of the invention, first and second solid state controlled rectifiers are provided in apparatus in which alternate, non-overlapping operation of the rectifiers is required. Master and slave pulsers, each comprising a unijunction transistor and an associated resistance-capacitor timing circuit are provided for respectively firing these rectifiers. Means are also provided for synchronously relating the timing cycles of the timing circuits comprising electrical connections from the anode-cathode circuit of the first controlled rectifier to the pulser for the second controlled rectifier. Additional means responsive to conduction in each of the controlled rectifiers are provided for supplying a lockout signal voltage to the second base terminal of the unijunction transistor in the pulser for the other controlled rectifier. Suitable turn-off circuitry is incorporated in order to quench the conducting controlled rectifier into a nonconductive state at the end of tis predetermined conduction period.

Figure 5:
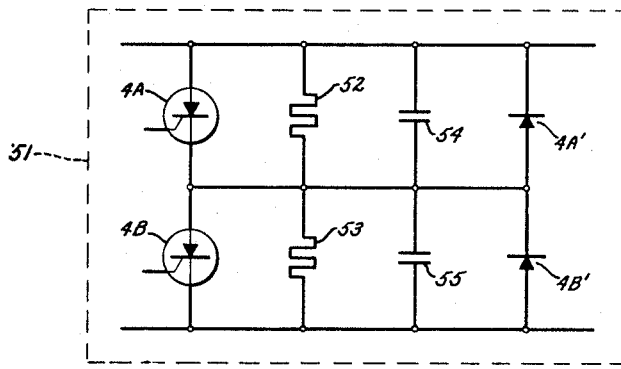

For a better and more complete understanding of the invention reference should now be had to the following specification and to the accompanying drawings of which:

FIG. 1 is a simple diagrammatic sketch in elementary form of an embodiment of the invention, FIGS. 2 and 3 are charts of characteristic curves which facilitate an understanding of the invention, FIG. 4 is a modification of FIG. 1 which provides half wave operation, and FIG. 5 is an alternative sub-assembly of a portion of the embodiments of FIGS. 1 and 4.

Referring now to the drawing, and particularly to FIG. 1, the invention is illustrated as being embodied in an inverter circuit in which direct voltage is converted into a substantially symmetrical and uniform periodically varying voltage. In the illustrated embodiment direct voltage is obtained from a plurality of voltage supply terminals such as terminals 1, 2 and 3 which are energized at different voltage levels. For example, terminal 1 may be 150 volts positive with respect to terminal 2 and terminal 3 may be 150 volts negative with respect to terminal 2 which thus may be considered a neutral terminal.

A series combination of solid state controlled rectifier 4 and the primary winding 5a of transformer 5 is connected across the direct voltage supply terminals 1 and 2. Under the control of suitable timing circuitry, such as pulser 6, and suitable quenching means 12, the controlled rectifier produces a series of substantially square wave rectangular current pulses 7a, 7b, 7c, etc. (FIG. 2) which flow in the primary winding 5a. A similar series combination of a solid state controlled rectifier 8 and the primary winding 9a of transformer 9 is connected across direct voltage terminals 2 and 3, and under the control of a suitable pulser 10 and suitable quenching means (conventionally illustrated by dashed rectangle 12a) controlled rectifier 8 produces a series of approximately square wave rectangular current pulses 11a, 11b, 11c, etc. which flow in the primary winding 9a. Transformer 5 has a main secondary winding 5b and transformer 9 has a main secondary winding 9b. Connected in series with controlled rectifier 4 is diode rectifier D1. A similar diode rectifier D2 is connected in series with controlled rectifier 8.

Controlled rectifier 4 has an anode 4a, a cathode 4b and a gate electrode 4c. It is of the type wherein conduction through the device is initiated by the gate electrode, but thereafter the gate electrode loses control over conduction. To turn off the controlled rectifier, suitable means 12 are provided for applying a quenching potential to the device. Briefly, this turn-off means comprises a saturable core reactor 13 operatively coupled to the controlled rectifier 4 and an energy storage device such as capacitor 14 in circuit relationship with reactor 13.

The pulser 6 incorporates means for producing a sawtooth voltage such as represented by the sawtooth shaped characteristic curve 15. This pulser is known as the master pulser. It is illustrated as comprising a series combination of resistor 16 and capacitor 17 connected across D.-C. supply terminals together with another parallel connected series combination of diode 18, unijunction transistor 19 and resistor 18a. As shown these two series combinations are connected across a portion of a voltage divider which is connected across the supply terminals 1 and 2. The unijunction transistor is a 3-terminal semiconductor device which has electrical characteristics that are quite different from those of conventional two junction transistors. Its most important feature is its highly stable negative resistance characteristic. Two ohmic contacts, known as base one (B1) and base two (B2) are made at opposite ends of a small bar of n type silicon. A single rectifying contact, called the emitter (E) is made on the opposite side of the bar close to base B2. In operation, capacitor 17 is charged through resistor 16 until the emitter voltage attains a predetermined value at which time the unijunction transistor turns on and discharges the capacitor through resistor 18a. As the capacitor discharges, the emitter voltage decreases abruptly until it reaches a value of about 2 volts at which value the emitter ceases to conduct and the unijunction transistor turns off; thereafter the cycle is repeated. In FIG. 2, the rising slope portion of curve 15 between points 15a and 15b represents the charging of capacitor 17 and the abrupt substantially vertical portion of the curve between points 15b and 15c approximately represents the discharge of the capacitor. The emitter current caused by the discharge of the capacitor produces a firing pulse that is supplied through the transformer 20 to the gate 4c and cathode 4b of controlled rectifier 4 to turn it on. Once turned on, the gate electrode loses control and the rectifier continues to conduct until turned off by the quenching circuit 12. As a result of repeated turn on and turn off, the controlled rectifier supplies a succession of square wave pulses 7a, 7b, 7c to the primary winding 5a. A corresponding series of pulses 23a, 23b, 23c, etc. is produced in the secondary circuit 5b of the transformer.

The pulser 10 which controls the firing of controlled rectifier 8 comprises a series combination of resistor 21 and capacitor 22 together with another series combination of diode 24, unijunction transistor 25 and resistor 26. These two series combinations are connected in parallel with each other between a point 27 and the negative supply terminal 3. For the purpose of synchronizing the operation of the pulser 10 with the operation of pulser 6, a series combination of diode 28, and a voltage divider comprising resistors 29 and 30 is connected between the cathode of controlled rectifier 4 and the negative supply terminal 3. When the controlled rectifier 4 is conducting, the voltage of its cathode is substantially equal to the voltage of supply terminal 1. The resistors 29 and 30 serve as a voltage divider and are so proportioned that approximately 90% of this voltage between the cathode of the controlled rectifier 4 and the negative supply terminal 3 appears across resistor 29 and the remaining 10% appears across resistor 30. Thus with the voltage of supply terminal 1 assumed to be 300 volts, the voltage at the intermediate common terminal of the two resistors will be 30 volts (with respect to negative terminal 3) and this voltage is applied to the point 27 as a charging voltage for capacitor 22 in the timing circuit of the slave pulser.

During the periods of nonconduction of the controlled rectifier 4, i.e., in the intervals between pulses 7a, 7b, 7c, etc. the cathode 4b of controlled rectifier 4 is maintained at the negative bus potential by means of diodes D1 and 37; these diodes are part of a network 31 which performs the function of resetting the magnetic flux in the core of transformer 5 during the periods in which the controlled rectifier does not conduct. This network comprises a linear inductor 32 connected in parallel with the primary winding 5a through a diode 33 that is poled to permit current flow from the inductor through the primary winding 5a in a direction opposite to that in which current from the controlled rectifier 4 flows during the conducting period. A series combination of resistor 34 and diode 35 is connected between an intermediate tap on the primary winding 5a and the common terminal 32a of inductor 32 and diode 33. In operation, when the controlled rectifier 4 is conducting, current flows in the primary winding and in the inductor winding in the direction of the solid line arrows, with the result that the voltage at the terminal 32a and the voltage at the terminal 36 of the primary winding are positive during such conduction as illustrated in FIG. 3 in which ordinates V36-2 represent the voltage between terminals 36 and 2 and abscissae represent time. Upon termination of conduction in the rectifier, the polarity of the voltage across the inductor 32 reverses and the energy stored in the inductor 32 causes a reverse current flow in the primary winding 5a, resistance 34 and diode 35 which resets the flux in the core of transformer 5. As a further result of the reverse current flow in primary winding 5a, the voltage at terminal 36 and consequently the voltage at the cathode of the controlled rectifier is made highly negative with respect to supply terminal 2. A clipping diode 37 prevents the voltage at the cathode from becoming more negative than the voltage of terminal 3. The clamping of upper terminal 36 of transformer 5 to the 150 volt negative supply terminal during the flux resetting operation permits capacitor 14 in the quenching network 12 to be charged to the full 300 volts between terminals 1 and 3. A similar flux resetting means 31a is provided for resetting the flux in the core of transformer 9 after termination of conduction in controlled rectifier 8.

For the purpose of preventing pulser 10 from firing the controlled rectifier 8 while controlled rectifier 4 is conducting, a lockout circuit is provided for the pulser 10. It is illustrated as comprising an electrical connection including a resistor 38 from the cathode of controlled rectifier 4 to the B2 base of the unijunction transistor 25 in the timing circuit of the slave pulser 10. When the controlled rectifier 4 becomes conducting its cathode voltage is raised substantially to the voltage of supply terminal 1 which was assumed to be 300 volts positive with respect to the negative terminal 3. As a result, the B2 base of transistor 25 is so positive with respect to its emitter that the transistor is maintained at cutoff irrespective of the voltage across capacitor 22. Consequently, when the voltage applied to terminal 27 to charge capacitor 22 in pulser 10 at the instant t1 (FIG. 2) is increased abruptly from zero volts to approximately 30 volts to initiate timing action in pulser 10, this pulser will not fire, as long as the controlled rectifier 4 is conducting and the B2 base of transistor 25 is locked out. Since the pulser 6 controls the initiating of timing in the pulser 10, the former is known as the master pulser and the latter is known as the slave pulser.

The resistor 21 and capacitor 22 of the slave pulser are proportioned to bring the emitter of unijunction transistor 25 to the turn-on value approximately half way between the pulse turn-on times t1, t2, t3 of the master pulser. Thus, assuming that the master pulser is to deliver firing pulses to the gate of controlled rectifier 4 at intervals of 320 microseconds the timing circuit for the slave pulser will preferably be designed to bring the emitter of the unijunction transistor 25 to the turn-on voltage 160 microseconds after the master pulser has turned on and delivered a firing pulse to the gate of controlled rectifier 4. Since each of the two controlled rectifiers 4 and 8 must be turned off before the other is fired in its turn, there is a small interval of time between the turn off of each controlled rectifier and the subsequent firing of the other.

For the purpose of continuing the application of a charging voltage to the timing capacitor 22 in the slave pulser after the controlled rectifier 4 has been turned off a capacitor 40 is connected in parallel with sections 29 and 30 of the voltage divider so that it will be charged to the full supply voltage when rectifier 4 is conducting. The blocking diode 28 prevents discharge of both capacitors 22 and 40 during the off period of controlled rectifier 4 when its cathode, to which both capacitors are connected, is at negative bus potential.

In order to prevent the master pulser 6 from supplying a firing pulse to the controlled rectifier 4 when the controlled rectifier 8 is conducting, means responsive to conduction of the controlled rectifier 8 are provided for supplying a lockout signal voltage to the bases of the unijunction transistor 19 in the master pulser 6. These means are illustrated as comprising an additional secondary winding 9c on transformer 9 connected to the bases B1 and B2 of the unijunction transistor 19 in the master pulser. A diode 41 is included in the connections and is poled so that positive voltage only is applied to the base B2 thereby to maintain transistor 19 turned off while controlled rectifier 8 is conducting.

The operation of the system is as follows: it is assumed that the controlled rectifier 8 has been conducting current represented by pulse 11a in FIG. 2. During this time a lockout voltage was supplied to the bases B2 and B1 of the unijunction transistor 19 in the master pulser 6 to prevent it from supplying a firing pulse to the gate of controlled rectifier 4. Similarly during this period, means responsive to the resetting of the flux in the core of transformer 5 has been supplying a lockout signal to the bases B2 and B1 of the unijunction transistor 19 in the master pulser. These last mentioned means are illustrated as an additional secondary winding 5c on transformer 5 having connections to the bases B2 and B1 of unijunction transistor 19 together with a rectifier 42 included in the connections and poled to apply only positive voltage to B2 thereby to maintain transistor 19 turned off during the flux reset in transformer 5. During this time the capacitor 17 in the master pulser is charging in accordance with the portion of curve 15 between points 15a and 15b. At the end of its predetermined conduction period, controlled rectifier 8 is turned off by a quenching voltage supplied by means of quenching circuit 12a which is similar to the quenching circuit 12 for controlled rectifier 4 and the flux in the core of transformer 9 is reset to the preconduction value by means of flux resetting means 31a. As a result of the turnoff of controlled rectifier 8, the lockout signal voltage supplied by the secondary winding 9c to the unijunction transistor 19 vanishes. Likewise, upon completion of flux reset in the core of transformer 5 the lockout signal supplied by secondary winding 5c vanishes and the unijunction transistor 19 is free to become conducting in response to a predetermined emitter voltage. Upon the voltage of the capacitor 17 attaining such predetermined value, represented in FIG. 2 by the ordinate of point 15b, the unijunction transistor 19 becomes conducting and discharges the capacitor 17 abruptly in accordance with the portion of the curve 15 between points 15b and 15c. As a result, a firing pulse is delivered to the cathode and gate of controlled rectifier 4 and the rectifier becomes conducting as indicated graphically by the abruptly rising square wave front of pulse 7b in FIG. 2. When controlled rectifier 4 is conducting, its cathode 4b is substantially at positive line potential. During the immediately prior conduction of controlled rectifier 8 (pulse 11a) capacitor 22 was discharged by the unijunction transistor 25 in the slave pulser and both capacitors 22 and 40 were being maintained discharged by the connection from the positive terminal of voltage divider 29 and 30 to the anode of controlled rectifier 8 which, when controlled rectifier 8 is conducting, is at negative bus potential. As shown, this connection includes the conductor 43 blocking diode 44 and resistor 45. Consequently, upon cessation of conduction in controlled rectifier 8 and establishment of conduction in controlled rectifier 4, the potential at the positive terminal of the above mentioned voltage divider is restored to full value (assumed to be 300 volts). Capacitor 40 is rapidly recharged and capacitor 22 is charged in accordance with the rising slope of curve 39 between points 39a and 39b in FIG. 2. Since the voltage of cathode 4b of controlled rectifier 4 is at substantially ful positive line voltage, a lockout voltage is supplied from the cathode 4b to the base B2 of the unijunction transistor 25 in the slave pulser. Thus the slave pulser is prevented from delivering a firing pulse to controlled rectifier 8 as long as controlled rectifier 4 is conducting. Such false operation is also prevented by the means for supplying a lockout voltage to the unijunction transistor 25 during flux reset in the core of transformer 9. This means is illustrated as comprising an additional secondary winding 9d connected through a blocking diode 46 poled to supply positive voltage to the base B2.

At the end of its predetermined conduction period, the controlled rectifier 4 is turned off by quenching means 12. This is represented graphically by the abrupt termination of pulse 7b. As a result of the conduction of pulse 7b, a corresponding pulse 23b is induced in the secondary winding 5b of transformer 5.

Upon completion of the reset of flux in the core of transformer 9 and upon termination of conduction of pulse 7b in controlled rectifier 4, the lockout voltages applied to unijunction transistor 25 in the slave pulser vanish. Action of the core flux resetting unit 31 in response to termination of conduction in controlled rectifier 4 reduces the voltage of the cathode 4b to the potential of negative bus 3 and capacitor 14 becomes charged to the full voltage between supply terminals 1 and 3. However, the diode 28 prevents the discharge of capacitor 40 which continues to supply charging voltage to capacitor 22 after conduction in rectifier 4 has terminated at the end of pulse 7b until the voltage supplied to the emitter of unijunction transistor 25 attains the predetermined value represented by the ordinate of point 39b of sawtooth curve 39 in FIG. 2. At this value, the unijunction transistor 25 becomes conductive and discharges capacitor 22 as represented by the vertical portion of the curve between points 39b and 39c. This causes a firing pulse to be delivered to the controlled rectifier 8 which causes it to fire as represented by the abrupt vertical wave front of pulse 11b. In response to conduction, the voltage of anode 8a of controlled rectifier 8 drops substantially to the potential of negative bus 3 thereby completing the discharge of capacitor 40 through diode 44 and resistor 45. At the end of a predetermined period, the controlled rectifier 8 is turned off by means of the quenching circuit 12a that is similar to quenching circuit 12; thereby to terminate the conduction pulse 11b. There is a brief interval a between the end of pulse 11b and the beginning of the next pulse 7c through controlled rectifier 4 in which it would be possible for the pulser 10 to deliver a new firing pulse to controlled rectifier 8 if the capacitors 40 and 22 were sufficiently charged. However, since the capacitor 14 in the quenching circuit 12 was fully charged by the resetting circuit 31 at the end of pulse 7b, the cathode 4b of controlled rectifier 4 is at the potential of negative bus 3. Consequently capacitors 40 and 22 are maintained discharged during the interval a so that no new firing pulse can be delivered to controlled rectifier 8 during this interval. The discharged condition of capacitor 22 during the conducting interval represented by the pulse 11b is graphically illustrated in FIG. 2 by the horizontal portion of sawtooth curve 39 between points 39c and 39d. The conduction of pulse 11b by controlled rectifier 8 in the primary winding 9a of transformer 9 produces a similar pulse 47b but of opposite polarity in the secondary winding of the transformer.

Thus it will be clear that the master and slave pulsers are synchronized with each other so that the timing action of both begins at substantially the same instant in each timing cycle and that suitable lockouts are provided for preventing either pulser from supplying a firing pulse to the gate of the controlled rectifier which it controls, when the other controlled rectifier is conducting or when the flux in the core of its associated transformer is resetting.

There are applications in which full wave operation may not be essential. In such cases the half wave modification illustrated in FIG. 4 may be employed. As shown, the FIG. 4 modification is essentially the same as the upper half of FIGURE 1 with the lockout circuit connections omitted.

In order to cover the required voltage range it may be necessary to employ two or more silicon controlled rectifiers connected in series instead of the single controlled rectifier 4. In such cases the portion of the circuitry enclosed within the dotted rectangle 50 may be replaced by the circuitry illustrated within the dotted rectangle 51 in FIG. 5 in which two controlled rectifiers 4A and 4B replace the single controlled rectifier 4 of FIG. 1 and of FIG. 4. A larger number of such controlled rectifiers connected in series may be provided if required. If either controlled rectifier 4A or 4B should have more leakage than the other, then substantially all of the voltage drop would appear across the rectifier having the greater leakage and the benefit of connecting a plurality of rectifiers in series would be lost. To obviate this possibility an RC network is provided. It is illustrated as comprising a plurality of resistors 52, 53 connected in series and each connected in parallel with a corresponding one of the controlled rectifiers 4A, 4B together with a plurality of capacitors 54, 55 connected in series with each other and each connected in parallel with a corresponding one of the controlled rectifiers. Appropriately each of the resistors 52, 53 may be 15K and rated ½ watt and each of the capacitors 54, 55 may be .05 mfd. The resistors provide static equalization of the voltage drops across the controlled rectifiers and the capacitors provide dynamic equalization. A plurality of diodes 4A', 4B' are connected in series with each other to replace the single diode of FIG. 1 and FIG. 4, and each of these diodes is connected in parallel with the corresponding controlled rectifier.

Although a particular embodiment of the invention has been shown and described, various modifications and changes will readily occur to those skilled in the art without departing from the true spirit of the invention or from the scope of the annexed claims.

What I claim as new and desire to secure by Letters Patent of the United States is:

1. In combination, relatively positive, negative and intermediate voltage supply terminals, a first solid state controlled rectifier having an anode, a cathode and a gate electrode and having its anode-cathode circuit connected to said positive and intermediate terminals, a second solid state controlled rectifier having its anode cathode circuit connected to said intermediate and negative terminals, master and slave pulsers, each comprising a unijunction transistor having an emitter and first and second base electrodes and a resistance capacitor timing circuit connected to said emitter and one of said bases, means for supplying voltage to said transistors and said timing circuits, electrical connections from the output of said master pulser to the cathode and gate of said first rectifier and from said slave pulser to the cathode and gate of said second rectifier and means for synchronously relating the initiation of the timing cycles of said timing circuits comprising a voltage divider connected between a point in the anode cathode circuit of said first rectifier and said negative terminal and connections from the capacitor of said slave pulser to points of voltage difference on said divider.

2. In combination relatively positive, negative and intermediate voltage supply terminals, a first solid state controlled rectifier having an anode, a cathode and a gate electrode and having its anode-cathode circuit connected to said positive and intermediate terminals, a second solid state controlled rectifier having its anode cathode circuit connected to said intermediate and negative terminals, master and slave pulsers, each comprising a unijunction transistor having an emitter and first and second base electrodes and a resistance capacitor timing circuit connected to said emitter and one of said bases, means for supplying voltage to said transistors and timing circuits, electrical connections from the output of said master pulser to the cathode and gate of said first rectifier and from said slave pulser to the cathode and gate of said second rectifier, a combined charging circuit for the capacitor of said slave pulser and synchronizing means for said pulsers comprising a voltage divider connected between a point in the anode cathode circuit of said first rectifier and said negative terminal and electrical connections, including said resistance, from said capacitor to points of voltage difference on said divider, and interlocking means for preventing each of said pulsers from supplying a firing pulse to its associated rectifier when the other rectifier is conducting comprising means responsive to conduction in the anode cathode circuit of each of said rectifiers for supplying an interbase hold off voltage to the unijunction transistor in the pulser for the other of said rectifiers, and means for maintaining a charging voltage on said capacitor in said slave pulser in the interval between the end of conduction of said first rectifier and the firing of the unijunction transistor in said slave pulser comprising a second capacitor that is relatively large with respect to said first capacitor connected in parallel with a portion of said voltage divider and a rectifier connected between said voltage divider and said point in said anode cathode circuit of said first rectifier.

3. In combination relatively positive and negative supply terminals, a transformer having primary and secondary windings, a solid state controlled rectifier having an anode, a cathode and a gate electrode and having its anode cathode conducting path connected in series relationship with said primary winding to said supply terminals, a pulser for supplying firing pulses in timed relationship to the cathode and gate of said rectifier to initiate conduction in said conducting path, means for supplying voltage to said pulser, quenching means for terminating said conduction at the end of a predetermined period comprising an energy storage network connected to said anode and said cathode, means for resetting the flux in the core of said transformer at the end of said predetermined conducting period comprising an inductive reactor connected to one of the windings of said transformer and a blocking rectifier connected in circuit with said reactor to permit current in said winding in the flux resetting direction thereby to produce a voltage at the anode-cathode connections of said network for storing energy therein, and means responsive to the flux variation in said core for preventing said pulser from supplying a firing pulse to said rectifier during said flux reset.

4. In combination, relatively positive and negative voltage supplying terminals, a transformer having primary and secondary windings, a solid state controlled rectifier having an anode, a cathode, and a gate electrode and having its anode cathode conduction path connected in series relationship with said primary winding to said supply terminals, a pulser for supplying firing pulses in timed relationship to said controlled rectifier to initiate conduction in said conduction path comprising a unijunction transistor having an emitter and first and second base electrodes, and a resistance-capacitor timing circuit connected to said emitter and to one of said base electrodes, connections from the output of said pulser to the cathode and gate of said controlled rectifier, means for supplying voltage to said pulser, quenching means for terminating said conduction at the end of a predetermined period comprising a capacitor-saturable reactor energy storage network connected to said anode and cathode, flux resetting means for the core of said transformer comprising an inductive reactor connected in parallel with said primary winding and a blocking rectifier included in the connection between said reactor and primary winding poled to permit current flow in said winding in the flux resetting direction, and lockout means for preventing said pulser from supplying firing pulses to said controlled rectifier during said flux reset comprising an auxiliary winding on said core connected to the bases of said transistor for supplying an interbase lockout voltage in response to the variation in flux in said core during said reset.

5. In combination, first and second solid state controlled rectifiers, each having an anode, a cathode and a gate electrode, means for supplying a direct voltage to said anodes and cathodes, master and slave pulsers each comprising a unijunction transistor and associated resistance capacitor timing network connected thereto, means for supplying voltage to said pulsers, electrical connections from the output of said master pulser to the gate and cathode of said first rectifier and from the output of said slave pulser to the gate and cathode of said second rectifier, means for synchronously relating the timing cycles of said timing circuits comprising an electrical connection from the anode-cathode conducting path of said first rectifier to the capacitor of said slave pulser, interlocking means for preventing each of said pulsers from supplying a firing pulse to its associated rectifier when the other rectifier is conducting comprising connections from the conducting path of each of said rectifiers to the bases of the transistor in the pulser for the other of said rectifiers for supplying to said bases a signal voltage derived from the current in the conducting path of the rectifier controlled by the other of said pulsers, a pair of transformers each having its primary winding connected in the anode-cathode conducting path of a corresponding one of said rectifiers, and means for resetting the flux in the core of each transformer at the end of the conducting period of its corresponding controlled rectifier comprising an inductive reactor connected in a path in parallel with the primary winding of said corresponding transformer and a blocking rectifier included in circuit with said reactor to permit current in said winding in the flux resetting direction.

References Cited by the Examiner
UNITED STATES PATENTS

| | | | |
|---|---|---|---|
| 2,899,627 | 8/59 | Steinberg | 321—27 |
| 2,953,735 | 9/60 | Schmidt | 321—5 |
| 3,047,789 | 7/62 | Lowry | 321—36 |

RALPH D. BLAKESLEE, *Acting Primary Examiner.*
SAMUEL BERNSTEIN, LLOYD McCOLLUM,
*Examiners.*